United States Patent
Chen et al.

(10) Patent No.: US 10,003,433 B2
(45) Date of Patent: Jun. 19, 2018

(54) STATISTICAL MODEL BASED CONTROL SIGNAL OUTER-LOOP ADJUSTMENT

(71) Applicant: Telefonaktiebolaget L M Ericsson (publ), Stockholm (SE)

(72) Inventors: Xixian Chen, Ottawa (CA); James Jianfeng Weng, Kanata (CA); Ahmed Nouah, Ottawa (CA); Ying Shao, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 153 days.

(21) Appl. No.: 14/406,149

(22) PCT Filed: Nov. 14, 2014

(86) PCT No.: PCT/IB2014/066059
§ 371 (c)(1),
(2) Date: Dec. 5, 2014

(87) PCT Pub. No.: WO2016/075517
PCT Pub. Date: May 19, 2016

(65) Prior Publication Data
US 2016/0261365 A1    Sep. 8, 2016

(51) Int. Cl.
*H04L 1/00* (2006.01)
*H04L 5/00* (2006.01)
(Continued)

(52) U.S. Cl.
CPC ............ *H04L 1/001* (2013.01); *H04L 1/0035* (2013.01); *H04L 5/006* (2013.01); *H04L 5/0055* (2013.01);
(Continued)

(58) Field of Classification Search
None
See application file for complete search history.

(56) References Cited

U.S. PATENT DOCUMENTS 6,622,024 B2    9/2003    Koo et al.
7,197,327 B2    3/2007    Koo et al.
(Continued)

FOREIGN PATENT DOCUMENTS

EP    1311076 B1 *    3/2007    ............ H04W 52/12
EP    2112778 A2    10/2009
(Continued)

OTHER PUBLICATIONS

Aho, K. et al., CQI Reporting Imperfections and their Consequences in LTE Networks, Proc. of the IARIA Tenth International Conference on Networks (ICN), St. Maarten, Netherlands Antilles, Jan. 23-28, 2011.
(Continued)

*Primary Examiner* — Xavier Szewai Wong
(74) *Attorney, Agent, or Firm* — Withrow & Terranova, PLLC

(57) ABSTRACT

Systems and methods for control signal outer-loop adjustment are disclosed. In some embodiments, a method of operation of a network node in a cellular communications network is provided. The method includes transmitting a control signal and a data signal to a wireless device. The method also includes detecting an ambiguous state of reception of the control signal by the wireless device based on a feedback of reception of the data signal. The method also includes, in response to detecting the ambiguous state of reception, updating a link adaptation (LA) parameter used to choose a coding scheme and power level for transmission of information in the control signal. By updating the LA parameter in response to detecting the ambiguous state of reception, the network node may provide improved performance.

17 Claims, 12 Drawing Sheets

(51) Int. Cl.
*H04W 52/14* (2009.01)
*H04W 72/04* (2009.01)
*H04W 72/08* (2009.01)
*H04W 52/32* (2009.01)
*H04W 76/04* (2009.01)

(52) U.S. Cl.
CPC ....... *H04W 52/146* (2013.01); *H04W 52/325* (2013.01); *H04W 72/042* (2013.01); *H04W 72/085* (2013.01); *H04W 76/048* (2013.01); *H04L 1/0009* (2013.01)

(56) References Cited

U.S. PATENT DOCUMENTS

| | | | |
|---|---|---|---|
| 7,423,976 B2 | 9/2008 | Wang et al. | |
| 7,801,548 B2 | 9/2010 | Koo et al. | |
| 8,265,681 B2 | 9/2012 | Wang et al. | |
| 8,270,507 B2 | 9/2012 | Schneider et al. | |
| 8,675,794 B1 | 3/2014 | Perets et al. | |
| 9,819,464 B2* | 11/2017 | Lee | H04L 5/0055 |
| 2003/0123598 A1 | 7/2003 | Gollamudi et al. | |
| 2004/0081248 A1* | 4/2004 | Parolari | H04L 1/0003 |
| | | | 375/259 |
| 2004/0121794 A1 | 6/2004 | Koo et al. | |
| 2005/0215276 A1 | 9/2005 | Koo et al. | |
| 2010/0085867 A1* | 4/2010 | Ji | H04W 72/005 |
| | | | 370/216 |
| 2013/0028307 A1 | 1/2013 | Ren et al. | |
| 2013/0170469 A1 | 7/2013 | Yu et al. | |
| 2013/0182569 A1 | 7/2013 | Bertrand et al. | |
| 2013/0310092 A1 | 11/2013 | Tabet et al. | |
| 2014/0086075 A1* | 3/2014 | Asokan | H04W 24/06 |
| | | | 370/252 |
| 2015/0117321 A1 | 4/2015 | Chen et al. | |
| 2015/0296394 A1* | 10/2015 | Svedman | H04L 47/266 |
| | | | 370/223 |
| 2015/0319643 A1* | 11/2015 | Zhu | H04W 72/1215 |
| | | | 370/336 |
| 2017/0214494 A1* | 7/2017 | Qiang | H04L 1/1819 |

FOREIGN PATENT DOCUMENTS

| | | |
|---|---|---|
| GB | 2433383 A | 6/2007 |
| GB | 2457759 A | 9/2009 |
| WO | 03096598 A1 | 11/2003 |
| WO | 2006055718 A2 | 5/2006 |

OTHER PUBLICATIONS

Author Unknown, "Technical Specification Group Radio Access Network; Evolved Universal Terrestrial Radio Access (E-UTRA); Physical layer procedures (Release 10)," Technical Specification 36.213, Version 10.9.0, Mar. 15, 2013, 126 pages.
Notice of Allowance and Examiner-Initiated Interview Summary for U.S. Appl. No. 14/067,449, dated Mar. 1, 2016, 19 pages.
International Search Report and Written Opinion for PCT/IB2014/064398 dated Dec. 22, 2014, 11 pages.
International Search Report and Written Opinion for PCT/IB2014/066059, dated Jul. 17, 2015, 10 pages.
Non-Final Office Action for U.S. Appl. No. 14/067,449, dated Aug. 26, 2015, 22 pages.

* cited by examiner

STATISTICAL MODEL BASED CONTROL SIGNAL OUTER-LOOP ADJUSTMENT

This application is a 35 U.S.C. § 371 national phase filing of International Application No. PCT/IB2014/066059, filed Nov. 14, 2014, the disclosure of which is incorporated herein by reference in its entirety.

FIELD OF THE DISCLOSURE

The present disclosure relates to a control signal outer-loop adjustment for the control signal link adaptation (LA) in a cellular communications network.

BACKGROUND $3^{rd}$ Generation Partnership Program (3GPP) Long Term Evolution (LTE) and LTE-Advanced standards are developed to meet growing capacity demands due to rapid expansion wireless data services. One challenging aspect of these standards is the optimal usage of limited radio resources shared by multiple wireless devices. Specifically, the physical downlink shared channel (PDSCH) is designed to carry downlink data, and the physical uplink shared channel (PUSCH) is designed to carry uplink data, while the physical downlink control channel (PDCCH) is designed to carry downlink control information (DCI) in each subframe to provide wireless devices with necessary scheduling information in terms of resource allocation, modulation and coding scheme information, and power level information for proper downlink data reception and/or uplink data transmission. The terms DCI and PDCCH are sometimes used interchangeably when there is no confusion.

In current LTE standards, there are several DCI formats including DCI formats 0 and 3 for uplink (UL) and DCI formats 1 and 2 for downlink (DL). A DCI carrying DL scheduling information is also called a DL assignment and a DCI carrying UL scheduling information a UL grant. The information of each DCI is rate matched and scrambled with a cell-specific and slot-specific scrambling sequence. One wireless device could have one or more DCIs in the same subframe. Each DCI is carried on one or more control channel elements (CCEs) depending on DCI length and DL radio channel condition. The number of CCEs used is often called the CCE aggregation level, which can be 1, 2, 4, or 8. An aggregation level larger than 1 means DCI payload is repeated over more than one CCE, resulting in a low code rate, which is often needed for wireless devices in poor radio channel conditions.

PDCCH link adaptation (LA) intends to choose an optimal CCE aggregation level and power for each DCI and for each wireless device based on the DL channel condition of the wireless device. If the channel condition is good, a small number of CCEs (a low CCE aggregation level) and/or a low transmit power may be used. Otherwise, a large number of CCEs and a high transmit power may be used. The number of control symbols available to be used for PDCCH is limited. As such, the number of available CCEs for each subframe, which are shared by all the wireless devices serviced by a network node, is also limited. That means the performance of PDCCH LA may greatly impact the LTE network performance by affecting factors such as capacity and the number of wireless devices served by a network node.

As an example, in the case of Voice over Internet Protocol (VoIP), which demands a large number of DCIs, PDCCH capacity may be a key limiting factor for VoIP capacity. If PDCCH LA is too aggressive by using a small number of CCEs for each wireless device and/or a low transmit power for each wireless device in order to support as many wireless devices as possible within each subframe, wireless devices may have more PDCCH decoding failures, meaning some wireless devices may fail to locate the related DL data sent through the physical downlink shared channel (PDSCH) or may miss UL grants for physical uplink shared channel (PUSCH) transmission. This may result in significant throughput reduction and/or reduced user satisfaction. On the other hand, if PDCCH LA is too conservative by using a large number of CCEs or a high transmit power for each wireless device, the number of wireless devices that can be accommodated within each subframe will be smaller, which may lead to a low VoIP capacity, which is especially unacceptable in VoIP applications. As such, good PDCCH LA design is important.

The DL channel condition used in the PDCCH LA for a wireless device is based on the Channel Quality Indicator (CQI), which is determined by the wireless device and reported to the network node through UL channels such as PUSCH or Physical Uplink Control Channel (PUCCH). The network node will use CQI reports to estimate Signal-to-Interference-plus-Noise ratio (SINR), which, together with a target PDCCH block error rate (BLER), is used to determine PDCCH LA. This is referred to as pure CQI report based PDCCH LA. Accurate and timely CQI reports will help the network node adjust the CCE aggregation level and transmit power. Unfortunately, accurate and timely CQI reports may be difficult to obtain due to these limitations: (a) CQI reporting cannot be too frequent, as its reporting interval is limited by signaling overhead; (b) CQI reporting accuracy may vary from one wireless device to another depending on wireless device specific implementation; (c) often, each wireless device derives its CQI by checking cell-specific reference signals, which may not necessarily take into account the interference on PDCCH regions or PDSCH resource blocks. As such, there is a strong need for an additional adjustment on the CQI reported from the wireless device. This additional adjustment is referred to as an outer-loop adjustment. The outer-loop adjustment done for control signal link adaptation, e.g., for the PDCCH LA, is referred to as control signal outer-loop adjustment. Similarly, there is also an outer-loop adjustment done for the data signal link adaptation, e.g., for the PDSCH LA, and that is referred to as data signal outer-loop adjustment.

SUMMARY

Systems and methods for a control signal outer-loop adjustment are disclosed. In some embodiments, a method of operation of a network node in a cellular communications network is provided. The method includes transmitting a control signal and a data signal to a wireless device and detecting an ambiguous state of reception of the control signal by the wireless device based on a feedback of reception of the data signal. The method also includes, in response to detecting the ambiguous state of reception, updating a Link Adaptation (LA) parameter used to choose a coding scheme and power level for transmission of information in the control signal. By updating the LA parameter in response to detecting the ambiguous state of reception, the network node may provide improved performance.

In some embodiments, detecting the ambiguous state of reception of the control signal by the wireless device comprises detecting that an acknowledgement (ACK) of the transmission of the data signal was not received.

In some embodiments, updating the LA parameter used to choose the coding scheme and power level comprises decrementing the LA parameter by a predetermined amount. In some embodiments, the predetermined amount is based on a Block Error Rate (BLER) of one or more radio channels. In some embodiments, the predetermined amount is $\text{downStep}_{NonAck}=\text{upStep}*(1-\text{TargetBLER}_{data})/\text{TargetBLER}_{data}$ where upStep is an amount by which the LA parameter is incremented when a reception of the control signal by the wireless device is confirmed and $\text{TargetBLER}_{data}$ is the target BLER for the data signal. The reception of the control signal by the wireless device is confirmed when an ACK of the transmission of the data signal is received.

In some embodiments, the predetermined amount at time t is $\text{downStep}_{NonAck}(t)=\text{upStep}*(1-\text{EstBLER}_{data}(t))/\text{EstBLER}_{data}(t)$ where $\text{EstBLER}_{data}(t)$ is the estimated BLER for the data signal at time t. In some embodiments, the estimated BLER for the data signal is $\text{EstBLER}_{data}(t)=(1-\alpha)*\text{EstBLER}_{data}(t-1)+\alpha*\text{Event}\{\text{NonAck}\}$ where Event{NonAck} is set to zero when the network node receives an ACK at time t from the wireless device and is otherwise set to one, and $\alpha$ is a predefined weighting factor between zero and one inclusive.

In some embodiments, detecting the ambiguous state of reception of the control signal by the wireless device comprises detecting that the network node is unable to distinguish whether a negative acknowledgment (NACK) or a Discontinuous Transmission (DTX) has occurred, where a DTX indicates that the control signal was not received by the wireless device. In some embodiments, updating the LA parameter used to choose the coding scheme and power level comprises decrementing the LA parameter by a predetermined amount. In some embodiments, the predetermined amount is based on a BLER of one or more radio channels. In some embodiments, the predetermined amount is based on an estimated probability the network node detects the ambiguous state of reception of the control signal by the wireless device, $\hat{P}_{NackDtx}$, and an estimated probability the network node detects an ambiguous state of DTX, $\hat{P}_{AmbDtx}$. The ambiguous state of DTX is a state in which the control signal was not received by the wireless device but the network node detects an ambiguous state between the NACK and DTX. In some embodiments, the predetermined amount is $\text{downStep}_{NackDtx}=\text{downStep}*\hat{P}_{AmbDtx}/\hat{P}_{NackDtx}-\text{upStep}*(1-\hat{P}_{AmbDtx}/\hat{P}_{NackDtx})$ where downStep is the amount by which the LA parameter is decremented when no reception of the control signal is confirmed. In some embodiments, $\hat{P}_{NackDtx}(t)=(1-\alpha)*\hat{P}_{NackDtx}(t-1)+\alpha*\text{Event}\{\text{NackDtx}\}$, $\hat{P}_{AmbDtx}=\text{TargetBLER}_{ctrl}-\hat{P}_{NonAmbDtx}$, and $\hat{P}_{NonAmbDtx}(t)=(1-\beta)*\hat{P}_{NonAmbDtx}(t-1)+\beta*\text{Event}\{\text{NonAmbDTX}\}$, where Event{NackDtx} is set to one when the network node detects the ambiguous state of reception of the control signal by the wireless device and is otherwise set to zero, Event{NonAmbDTX} is set to one when the network node detects a DTX without ambiguity by the wireless device and is otherwise set to zero, $\alpha$ is a weighting factor between zero and one inclusive, and $\beta$ is a weighting factor between zero and one inclusive.

In some embodiments, the cellular communications network is a Long Term Evolution (LTE) network. In some embodiments, the control signal is transmitted on a Physical Downlink Control Channel (PDCCH) and the data signal is transmitted on a Physical Downlink Shared Channel (PDSCH). In some embodiments, the control signal outer-loop adjustment is the PDCCH outer-loop adjustment.

In some embodiments, a device is adapted to transmit a control signal and a data signal to a wireless device; detect an ambiguous state of reception of the control signal by the wireless device based on a feedback of reception of the data signal; and in response to detecting the ambiguous state of reception, update an LA parameter used to choose a coding scheme and power level for transmission of information in the control signal.

In some embodiments, a network node in a cellular communications network comprises a processor and a memory coupled to the processor. The memory contains instructions executable by the processor whereby the network node is operative to transmit a control signal and a data signal to a wireless device; detect an ambiguous state of reception of the control signal by the wireless device based on a feedback of reception of the data signal; and in response to detecting the ambiguous state of reception, update an LA parameter used to choose a coding scheme and power level for transmission of information in the control signal.

In some embodiments, a device comprises a transmit module operative to transmit a control signal and a data signal to a wireless device; a state detection module operative to detect an ambiguous state of reception of the control signal by the wireless device based on a feedback of reception of the data signal; and an LA update module operative to, in response to detecting the ambiguous state of reception, update an LA parameter used to choose a coding scheme and power level for transmission of information in the control signal.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1A:
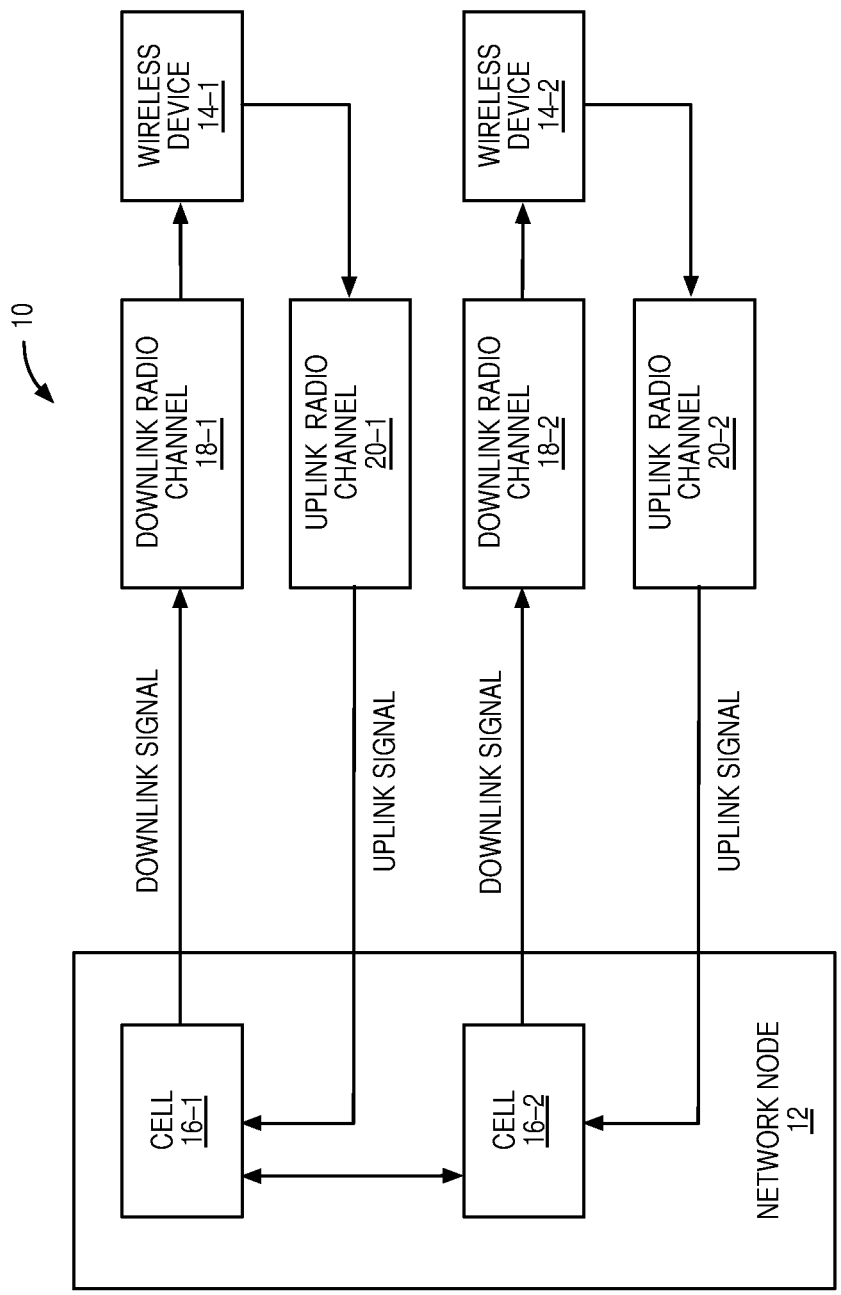
FIG. 1A is a diagram depicting an exemplary cellular communications network for communications between cells and wireless devices.

Before discussing the embodiments of the current disclosure, an exemplary cellular communications network 10 for communications between a network node 12 and wireless devices 14-1 and 14-2 (referred to herein as wireless device 14 or wireless devices 14) is discussed. Network node 12 may support more than one cell. Here, a cell is a geographical area covered by a base station transceiver such that all wireless devices 14 in the geographical area have wireless connections with the base station for communications. Sometimes, a cell also refers to a network node 12 serving all wireless devices 14 in the geographical area. The terms network node and cell are sometimes used interchangeably when there is no confusion. In FIG. 1A, the cellular communications network 10 is a $3^{rd}$ Generation Partnership Project (3GPP) Long Term Evolution (LTE) cellular communications network. As such, 3GPP terminology is oftentimes used herein. However, while the embodiments described herein focus on 3GPP LTE, the embodiments and concepts disclosed herein may be used in any suitable type of cellular communications network (e.g., WiMAX). Cellular communications network 10 is illustrated in FIG. 1A and includes a network node 12 comprised of cell 16-1 and cell 16-2 (referred to herein as cell 16 or cells 16), a wireless device 14-1 which communicates with cell 16-1 using a downlink radio channel 18-1 and an uplink radio channel 20-1, a wireless device 14-2 which communicates with cell 16-2 using a downlink radio channel 18-2 and an uplink radio channel 20-2. The uplink signal sent from a wireless device 14 to a cell 16 may include at least one of downlink Channel Quality Indicator (CQI) report, Hybrid Automatic Repeat Request (HARQ) Acknowledge (ACK) and/or Negative Acknowledge (NACK) feedback, and uplink data. The CQI and HARQ ACK/NACK are for the corresponding cell 16 which the wireless device 14 is in. In FIG. 1A, network node 12 includes two cells 16. Each cell is an evolved (or enhanced) Node B (eNB) responsible for wirelessly transmitting data to and wirelessly receiving data from a wireless device 14 in the cellular communications network 10. While only two wireless devices 14 are shown in FIG. 1A, the system is not limited thereto. Note that while the network node 12 has two cells 16 in this embodiment, network node 12 may alternatively be a low power or small base station (e.g., pico, micro, or home eNB) in a heterogeneous deployment. Also, wireless devices 14 may be User Equipments (UE).

Figure 1B:
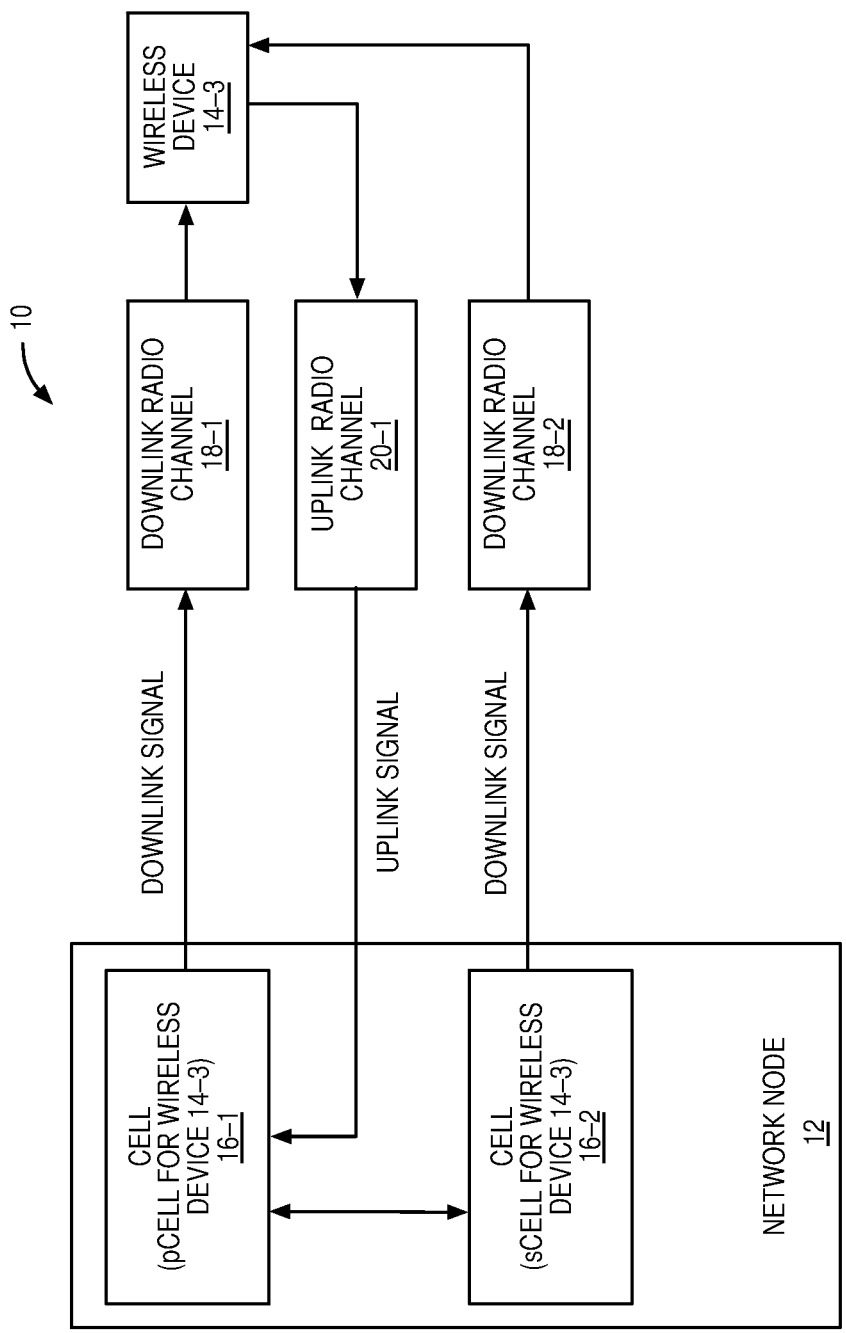
FIG. 1B is a diagram of a network node comprising a primary cell (pCell) and a secondary cell (sCell) for a wireless device.

The network node 12 in FIG. 1A may configure wireless devices 14 to receive downlink signals from more than one cell simultaneously, where each cell 16 may use a different carrier frequency to carry a downlink signal. This is called carrier-aggregation, in which a cell 16 is termed as a carrier. A carrier-aggregation capable wireless device 14 may be configured to receive downlink signals from more than one carrier (or cell 16) but send uplink signal back to one cell 16 only. A cell 16 with which a wireless device 14 initially established a communication and to which the wireless device 14 is sending an uplink signal is called the primary cell (pCell) for the wireless device 14, while a cell sending additional downlink signal to the wireless device 14 is called a secondary cell (sCell) for the wireless device 14. This is illustrated in FIG. 1B, where wireless device 14-3 is receiving downlink signals from cell 16-1 and cell 16-2 but is sending an uplink signal to cell 16-1. In this case, cell 16-1 is the pCell for wireless device 14-3 while cell 16-2 is a sCell for wireless device 14-3. While only one sCell is shown in FIG. 1B, the system is not limited thereto. A wireless device 14 may be serviced by one pCell and more than one sCell. Also, the concept of pCell and sCell are device specific, meaning a pCell for one wireless device 14 may be an sCell for another wireless device 14 and an sCell for one wireless device 14 may be a pCell for another wireless device 14. When a wireless device 14 is configured to receive data from more than one carrier, the uplink signal sent from the wireless device 14 to the pCell may include at least one of downlink CQI report, and HARQ ACK and/or NACK feedback for the pCell and for at least one sCell.

Figure 2A:
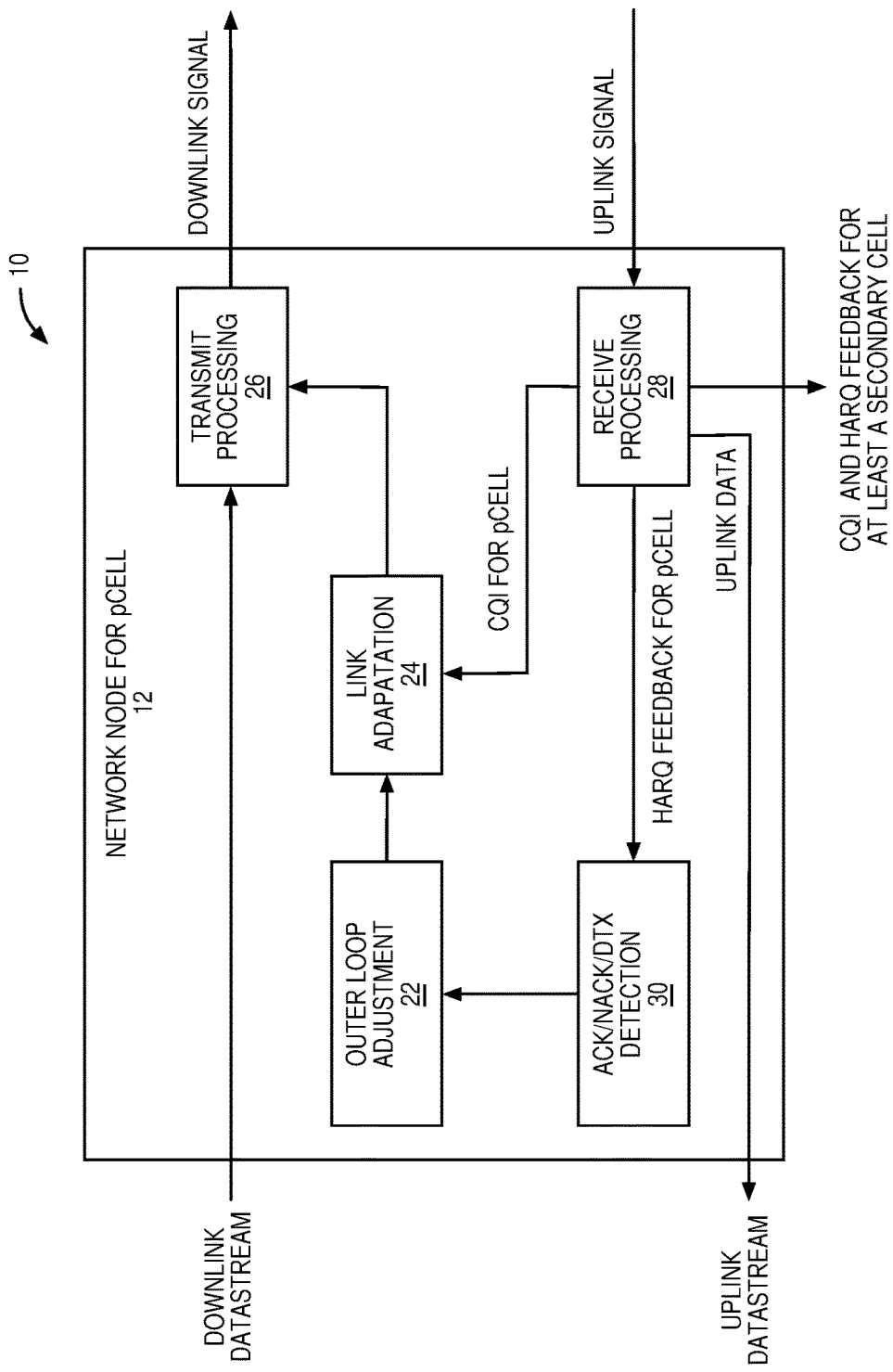
FIG. 2A is a diagram depicting an exemplary network node functioning as a primary cell (pCell) for a wireless device with a control signal outer-loop adjustment for link adaptation.

To address the limitations in the pure Channel Quality Indicator (CQI) report based Physical Downlink Control Channel (PDCCH) LA, each cell 16 may include an outer-loop adjustment block to determine a control-signal outer-loop adjustment for a wireless device 14. This is illustrated in FIG. 2A, where network node 12 is a pCell of a wireless device 14, and an outer-loop adjustment block 22 is used to determine a control-signal outer-loop adjustment (outerLoopAdj) for a given wireless device 14. The outer-loop adjustment outerLoopAdj is added to a PDCCH Signal-to-Interference-plus-Noise Ratio (SINR) estimate based on CQI reports for the pCell. The resultant SINR estimate is used by the link adaptation 24 to determine the required Control Channel Element (CCE) aggregation level and transmit power, perhaps as discussed above. Though not explicitly shown, the outer-loop adjustment block 22 also determines a data-signal outer-loop adjustment for PDSCH link adaptation. The outputs of both control signal and data-signal link adaptation are used to control a transmit processing block 26. The received uplink signal from the wireless device 14 contains at least one of CQI reports, HARQ ACK/NACK feedback, and uplink data for the pCell and perhaps an sCell as shown in FIG. 2A. Receive processing block 28 extracts CQI and/or a HARQ feedback signal for at least one cell 16. The CQI report for pCell is fed to link adaptation block 24, where the CQI is used to estimate SINRs for PDCCH and PDSCH. The feedback signal for pCell is fed to ACK/NACK/Discontinuous Transmission (DTX) detection block 30, where an ACK, NACK, or DTX state of reception refers to the state of reception of the data signal by the wireless device 14. In some cases, an ambiguous state of reception of the control signal by the wireless device 14 is detected. Here, DTX represents Discontinuous Transmission, and it is used to indicate a state where an uplink signal from a wireless device 14 is expected but not detected by the network node 12. The results from ACK/NACK/DTX detection block 30 are fed to outer-loop adjustment block 22 to update the value of control-signal outer-loop adjustment for control-signal link adaptation as well as to update the value of data-signal outer-loop adjustment for data-signal link adaptation. The CQI and HARQ feedback for at least a secondary cell (sCell) are fed to an outer-loop adjustment determination block to determine a control-signal outer-loop adjustment for the wireless device 14 in a secondary cell.

Figure 2B:
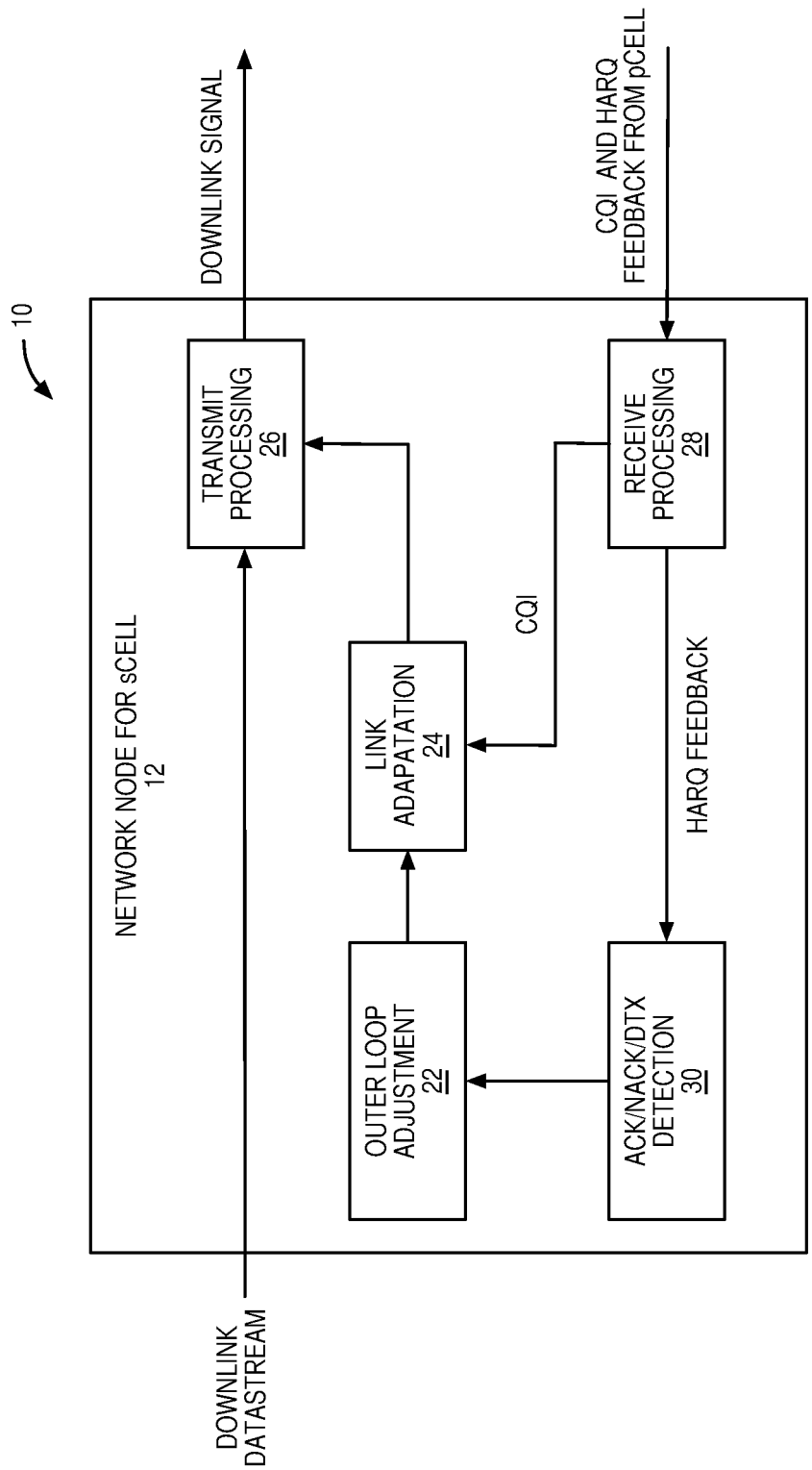
FIG. 2B is a diagram depicting an exemplary network node functioning as a secondary cell (sCell) for a wireless device with a control signal outer-loop adjustment for link adaptation.

The outer-loop adjustment block to determine a control-signal outer-loop adjustment for the wireless device 14 in an sCell is illustrated in FIG. 2B. This is similar to the one in the pCell of the wireless device 14 in FIG. 2A except that the CQI report and HARQ feedback are not extracted from an uplink signal as the wireless device 14 does not send any uplink signal to its sCell. Rather the CQI report and HARQ feedback are from the pCell. As shown in FIG. 2B, an outer-loop adjustment block 22 is used to determine a control-signal outer-loop adjustment (outerLoopAdj) for a given wireless device 14. The outer-loop adjustment outerLoopAdj is added to a PDCCH SINR estimate based on CQI reports. The resultant SINR estimate is used by the link adaptation 24 to determine the required CCE aggregation level and transmit power, perhaps as discussed above. Though not explicitly shown, the outer-loop adjustment block 22 also determines a data-signal outer-loop adjustment for PDSCH link adaptation. The outputs of both control signal and data-signal link adaptation are used to control a transmit processing block 26. Receive processing block 28 extracts CQI and HARQ feedback signal for the sCell. The feedback signal is fed to ACK/NACK/DTX detection block 30, where ACK, NACK, and/or DTX state of reception of the data signal by the wireless device 14 is detected. In some cases, an ambiguous state of reception of the control signal is detected. The results from ACK/NACK/DTX detection block 30 are fed to outer-loop adjustment block 22 to update the value of control-signal outer-loop adjustment for control-signal link adaptation as well as to update the value of data-signal outer-loop adjustment for data-signal link adaptation. The link adaptations here are for the wireless device 14 in the sCell.

For more details regarding data-signal outer-loop adjustment, the interested reader is directed to U.S. patent application Ser. No. 14/071,829, entitled GENERALIZED OUTER LOOP LINK ADAPTATION, now U.S. Pat. No. 9,203,590, and is hereby incorporated herein by reference for its teachings on data-signal outer-loop adjustment.

Figure 3:
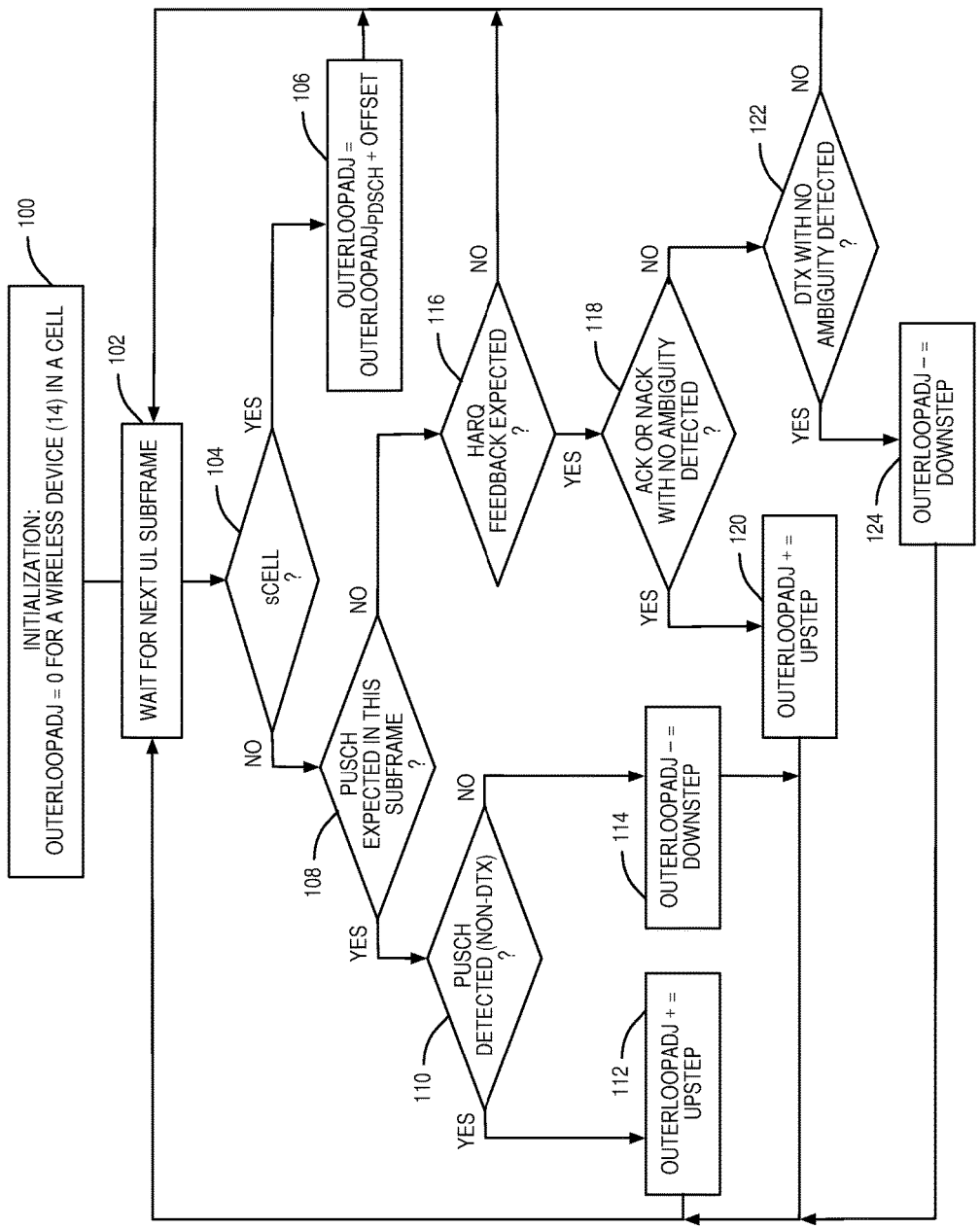
FIG. 3 illustrates a procedure of performing a control-signal outer-loop adjustment for a wireless device at a network node.

FIG. 3 illustrates the procedure of a network node 12 for performing a control-signal outer-loop adjustment, denoted by outerLoopAdj, for the control-signal link adaptation for a wireless device 14 in a given cell 16. The given cell 16 can be a pCell or an sCell. The network node 12 first initializes the outerLoopAdj value for the wireless device 14 (step 100). In this example, the outerLoopAdj value is set to zero, but the current disclosure is not limited thereto. The outerLoopAdj value is potentially updated for each UL subframe and the network node 12 waits for the next UL subframe (step 102). If the given cell is an sCell (step 104), the outerLoopAdj value for the control-signal is not calculated independently from the outer-loop adjustment calculation for the data-signal, but is instead set to the outerLoopAdj$_{PDSCH}$, a data-signal outer-loop adjustment value calculated for a Physical Downlink Shared Channel (PDSCH), plus an offset (step 106). It is more important for the wireless device 14 to decode the PDCCH signal than to decode the PDSCH signal. As such, this offset intends for the control-signal link adaptation to choose a conservative coding and power setting for the control signal such that the PDCCH signal will be at least as easily decodable as the PDSCH signal. The reason for that arrangement is due to the fact that for sCells most UL subframes will include some ambiguity about whether the PDCCH signal was received by the wireless device 14. What is meant by ambiguity will be discussed in more detail below.

Returning to FIG. 3, if the given cell is not a sCell, a further check on the presence of Physical Uplink Shared Channel (PUSCH) will be done if a PUSCH corresponding to a UL grant is expected (step 108). If a PUSCH is expected, a determination is made as to whether a PUSCH is detected in the subframe (step 110). If so, outerLoopAdj is adjusted up by upStep (step 112) which is the amount by which the control-signal LA parameter is incremented when reception of the control signal is confirmed. This indicates that the UL grant on the PDCCH was received by the wireless device 14, and the network node 12 can increase the control-signal outerLoopAdj to send to link adaptation 24 for the wireless device 14. If PUSCH was expected but is not detected, outerLoopAdj is adjusted down by downStep (step 114). This indicates that the PDCCH was not received by the wireless device 14, and the network node 12 should decrease the control-signal outerLoopAdj to send to link adaptation for the wireless device 14. When the wireless device 14 fails to send a transmission, this is referred to herein as a Discontinuous Transmission (DTX). The network node 12 can detect the presence of PUSCH by detecting insufficiently received energy on the expected demodulation reference signals (DMRS).

If PUSCH is not expected, a determination is made as to whether HARQ feedback corresponding to a DL assignment is expected in the subframe (step 116). If HARQ feedback is not expected, the process returns to step 102 to wait for the next UL subframe. If HARQ feedback is expected, the network node 12 checks for either an acknowledgment (ACK) or a negative ACK (NACK) (step 118). When an ACK or a NACK can be determined without any ambiguity, outerLoopAdj is adjusted up by upStep (step 120) and the process then returns to step 102 to wait for the next subframe. If an ACK or a NACK is detected without any ambiguity, this indicates that the PDCCH was received by the wireless device 14 and the network node 12 can increase the control-signal outerLoopAdj to send to link adaptation 24. What is meant by determining without any ambiguity will be discussed in more detail below.

If an ACK or a NACK is not detected without ambiguity, the network node 12 checks for a DTX with no ambiguity (step 122). A DTX with no ambiguity means that an ACK or NACK should be present in the subframe but its energy is not detected. In that case, outerLoopAdj is adjusted down by downStep (step 124). This indicates that the PDCCH was not received by the wireless device 14 and the network node 12 should decrease the outerLoopAdj to send to link adaptation 24. In this manner, outerLoopAdj is updated only if there is no ambiguity regarding the reception of an ACK, the reception of a NACK, or a DTX. If there is ambiguity, then outerLoopAdj is not changed. As a result, as discussed below in detail, the link adaptation is less than ideal.

More specifically, the afore-described outer-loop adjustment procedure works well whenever the HARQ feedback result can be determined to be one of these three cases:
 (a) PDSCH ACK—wireless device 14 successfully decodes both PDCCH and PDSCH of a cell and sends ACK of the PDSCH of the cell back to a network node 12;
 (b) PDSCH NACK—wireless device 14 successfully decodes PDCCH of a cell but fails to decode PDSCH of the cell, and reports back NACK of the PDSCH of the cell to a network node 12; and
 (c) DTX—wireless device 14 fails to decode PDCCH of a cell and does not send any feedback for the cell to a network node 12.

However, as alluded to above, there are cases where there is an ambiguity between NACK and DTX. Some of these cases include when HARQ-NACK and a Scheduling Request (SR) need to be transmitted on the same resource. When the wireless device 14 transmits the SR, the HARQ feedback will appear to be a NACK. However, it is possible that the wireless device 14 did not receive PDCCH, but the presence of the SR bit may appear as a NACK. Since the two possibilities result in opposite actions (NACK implies PDCCH was received; DTX implies PDCCH was not received), the network node 12 does nothing in response to this uplink subframe.

In the case of carrier aggregation, a wireless device 14, wireless device 14-3 in FIG. 1B as an example, is connected to a pCell and one or more sCells. The wireless device 14 needs to send HARQ feedback for pCell and each of the configured sCells regardless of the PDCCH decoding result. This also results in an ambiguity. Specifically, HARQ feedback may be carried by PUSCH to the network node 12 where HARQ feedback for pCell and each configured sCell may be concatenated. As such, if the wireless device 14 cannot detect any PDCCH in one configured sCell, the wireless device 14 needs to send NACK, which actually means a DTX whenever there is something scheduled on the sCell. In this situation, it is not possible for the network node 12 to distinguish between a NACK and a DTX.

Another possibility is that HARQ feedback may be carried by the PUCCH to the network node 12 where HARQ feedback bits for pCell and configured sCells are jointly coded. In some cases of jointly coded HARQ feedback, there is no distinction between NACK and DTX by design. Table 1 below is an example which is copied from Table 10.1.2.2.1-3 for PUCCH format 1b in Technical Specification (TS) 36.213, with two PUCCH resources. The cases labeled NACK/DTX are cases with ambiguity as the network node 12 is not able to distinguish between a NACK and a DTX and therefore does nothing in response to this uplink subframe.

TABLE 1

Transmission of Format 1b HARQ-ACK channel selection

| HARQ-ACK(0) | HARQ-ACK(1) | $n_{PUCCH}^{(1)}$ | b(0)b(1) |
| --- | --- | --- | --- |
| ACK | ACK | $n_{PUCCH,1}^{(1)}$ | 1, 1 |
| ACK | NACK/DTX | $n_{PUCCH,0}^{(1)}$ | 1, 1 |

TABLE 1-continued

Transmission of Format 1b HARQ-ACK channel selection

| HARQ-ACK(0) | HARQ-ACK(1) | $n_{PUCCH}^{(1)}$ | b(0)b(1) |
| --- | --- | --- | --- |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | | No Transmission |

These cases result in an ambiguous state of reception of the control signal by the wireless device 14. When the network node 12 detects this ambiguous state of reception, the PDCCH outer-loop algorithm described in FIG. 3 chooses not to do any outer-loop adjustment. In other words, the PDCCH outer-loop algorithm described in FIG. 3 does outer-loop adjustment only in scenarios when there is no ambiguity between DTX and NACK. In this way, many opportunities to adjust the PDCCH LA may be missed, leading to less efficient use of PDCCH resources.

Figure 4:
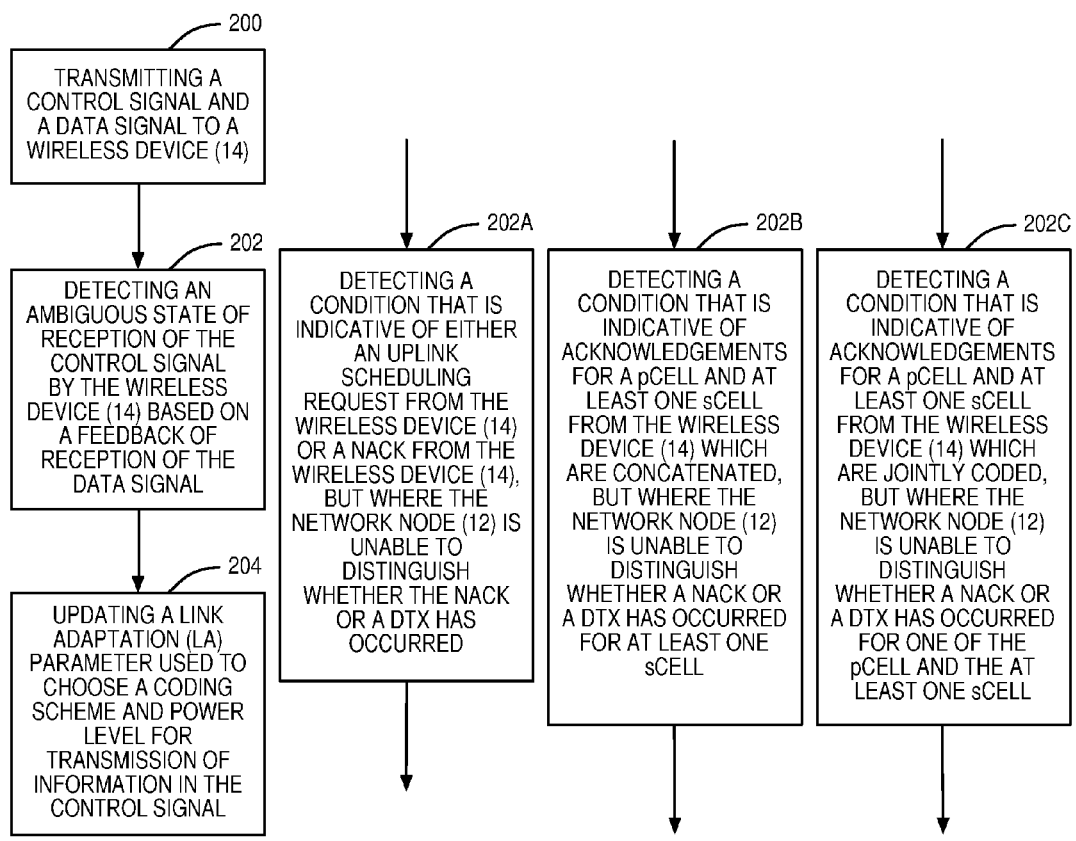
FIG. 4 illustrates the operation of a network node for performing a control-signal outer-loop adjustment for link adaptation when detecting an ambiguous state of reception of a control signal by a wireless device according to some embodiments of the present disclosure.

To address the limitations in the method of FIG. 3, an exemplary operation of a network node 12 for performing a control-signal outer-loop adjustment for the PDCCH LA in a cell when detecting an ambiguous state of reception of a control signal by a wireless device 14 is provided. This is illustrated in FIG. 4. According to some embodiments of the present disclosure, the network node 12 in a cell transmits a control signal and a data signal to a wireless device 14 (step 200). The network node 12 in the cell then detects an ambiguous state of reception of the control signal by the wireless device 14 based on a feedback of reception of the data signal (step 202). The network node 12 then updates a control-signal LA parameter for the cell used to choose a coding scheme and power level for transmission of information in the control signal for the wireless device 14 in the cell (step 204).

Step 202 may involve at least one method of detecting an ambiguous state of reception of the control signal in a cell by a wireless device 14. As an example, the network node 12 may detect a condition that is indicative of either an UL SR from the wireless device 14 or a NACK from the wireless device 14, but the network node 12 is unable to distinguish whether the NACK or a DTX has occurred (step 202A). As another example, the network node 12 may detect a condition that is indicative of HARQ ACKs and/or NACKs for a pCell and at least one sCell from the wireless device 14 which are concatenated, but where the network node 12 is unable to distinguish whether a NACK or a DTX has occurred for at least one sCell (step 202B). Also, the network node 12 may detect a condition that is indicative of HARQ ACKs and/or NACKs for a pCell and at least one sCell from the wireless device 14 which are jointly coded, but where the network node 12 is unable to distinguish whether a NACK or a DTX has occurred for one of the pCell and the at least one sCell (step 202C).

Figure 5:
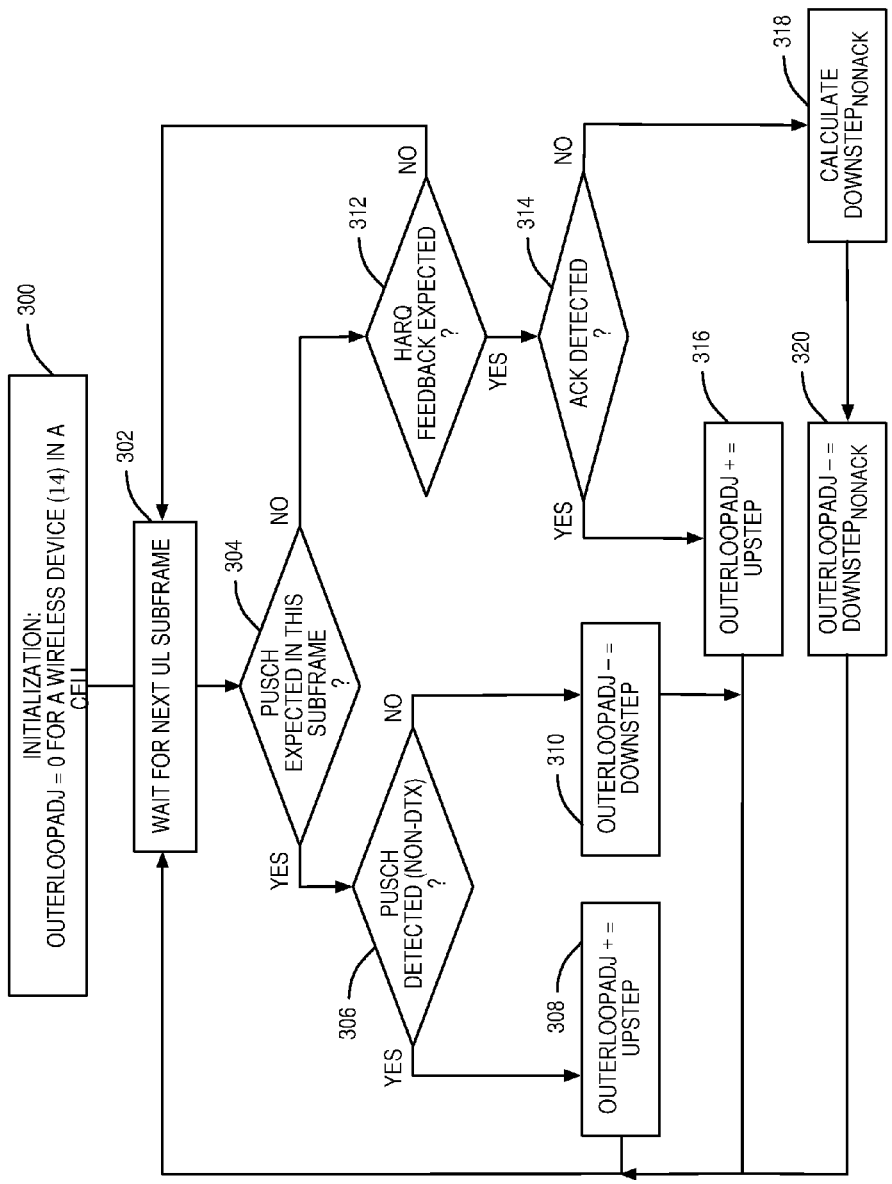
FIG. 5 illustrates a procedure for performing a control-signal outer-loop adjustment for link adaptation when detecting an ambiguous state of reception of a control signal by a wireless device according to some embodiments of the present disclosure.

FIG. 5 illustrates a procedure of a network node 12 in a cell for performing a control-signal outer-loop adjustment for the PDCCH LA for a wireless device 14 in the cell when detecting an ambiguous state of reception of a control signal by the wireless device 14 according to some embodiments of the present disclosure. The network node 12 first initializes the outerLoopAdj value for the wireless device 14 in the cell (step 300). In this example, the outerLoopAdj value is set to zero, but the current disclosure is not limited thereto. The outerLoopAdj value is potentially updated for each UL subframe, and the network node 12 waits for the next UL subframe (step 302). Similar to the process in steps 108-114 of FIG. 3, the network node 12 then checks on the presence of PUSCH if a PUSCH corresponding to a UL grant is expected (step 304). The PUSCH may be expected if the cell is a pCell. The PUSCH is never expected if the cell is an sCell. If a PUSCH is detected (step 306), outerLoopAdj is adjusted up by upStep (step 308). This indicates that the PDCCH was received by the wireless device 14, and the network node 12 can increase the outerLoopAdj to send to link adaptation 24 for the wireless device 14. If PUSCH was expected but is not detected, outerLoopAdj is adjusted down by downStep (step 310). This indicates that the PDCCH was not received by the wireless device 14, and the network node 12 should decrease the outerLoopAdj to send to link adaptation 24. When the wireless device 14 fails to send a transmission, this is referred to herein as a DTX.

If PUSCH is not expected, a determination is made as to whether HARQ feedback corresponding to a DL assignment for the cell is expected in the subframe (step 312). If HARQ feedback is not expected, the process returns to step 302 to wait for the next UL subframe. If HARQ feedback is expected, the network node 12 checks for an ACK from wireless device 14 (step 314). When an ACK is received, outerLoopAdj is adjusted up by upStep (step 316). This indicates that the PDCCH was received by the wireless device 14, and the network node 12 can increase the outerLoopAdj to send to link adaptation 24. If an ACK is not received, the network node 12 calculates a value for downStep$_{NonACK}$ (step 318). This same value is used for all cases where an ACK is not received from the wireless device 14. This will cover cases where an unambiguous NACK is received, where an unambiguous DTX occurs, and when the network node 12 detects an ambiguous state of reception of the control signal by the wireless device 14. Note that calculation of downStep$_{NonACK}$ may be performed in any suitable manner and may be calculated in advance or received from some other source. As discussed below in detail, in some embodiments, downStep$_{NonACK}$ is calculated based on a statistical model of the occurrence of NACK and/or DTX events.

Once the value of downStep$_{NonACK}$ has been calculated or otherwise determined, the network node 12 adjusts outerLoopAdj down by downStep$_{NonACK}$ (step 320). According to some embodiments, by updating the LA parameter when any of these NonACK events occurs, the network node 12 is able to make adjustments even in ambiguous situations. This stands in contrast to the method described in FIG. 3 where any ambiguous cases caused the method to make no changes to the LA parameter. Another difference between the method of operation described in FIG. 5 and the one described in FIG. 3 is the treatment of sCells. In the method of operation described in FIG. 3, sCells were treated differently. In the method of operation described in FIG. 5, sCells may be treated the same as pCells or a single cell, according to some embodiments.

The value of downStep$_{NonAcK}$ can be calculated in many different ways. In some embodiments, downStep is an averaged downStep which is computed based on the estimated probabilities of NACK and DTX events conditioned on the occurrence of non ACK events. In some embodiments, by using an averaged downStep outer-loop adjustment when there is a non ACK feedback, which is smaller than the normal downStep adjustment, the adjustment is smaller and completed in multiple steps. This precision may help reduce the variations of the PDCCH adjustment.

In LTE, a network node 12 arranges two outer-loop adjustments for a wireless device 14 in a cell: one for PDSCH LA and the other for PDCCH LA. In an example where PDSCH has a TargetBLER$_{pdsch}$=10% and Target-BLER$_{pdcch}$=1%, and the actual BLERs for both PDSCH and PDCCH have reached a steady-state, for 100 DL transmissions, the wireless device 14 may on average send 90 PDSCH ACKs, 9 PDSCH NACKs, and 1 DTX to the network node 12 for the cell. That means for 100 DL transmissions, PDCCH outer-loop adjustment, OuterLoopAdj may need to be increased by 99 upSteps and decreased by one downStep in order to reach its target BLER of 1%. In some embodiments, this can be accomplished by:

(1) For each received ACK, increase outerLoopAdj by an upStep. For 90 ACKs, outerLoopAdj will be increased by 90 upSteps.
(2) For 10 received NonAcks (NACK or DTX or NackDtx) which may include 9 NACKs and 1 DTX on average, outerLoopAdj may be increased by 9 upSteps and decreased by one downStep. Here, NackDtx is defined as the events occurring in which a network node 12 cannot distinguish between NACK and DTX from the HARQ feedback as discussed above. For each received NonAck (NACK or DTX or NackDtx) HARQ feedback, outerLoopAdj may be increased by (9/10)*upStep and decreased by (1/10)*downStep.

In this case, the averaged decrease value when a NonAck is received may be:

$$\text{downStep}_{NonAck}=(1/10)*\text{downStep}-(9/10)*\text{upStep} \quad (1)$$

Equation 1 can be generalized as:

$$\text{downStep}_{NonAck}=P\{DTX|NonAck\}*\text{downStep}-P\{NACK|NonAck\}*\text{upStep} \quad (2)$$

where P{DTX|NonAck} is the conditional probability of DTX. Note that the probability of DTX, i.e., P{DTX}, is the PDCCH decoding error. P{NACK|NonAck} is the conditional probability of NACK. Note that the probability of NACK, i.e., P{NACK}, is the PDSCH decoding error.

From statistics:

$$P\{DTX|NonAck\}*P\{NonAck\}=P\{DTX,NonAck\}$$

$$P\{NACK|NonAck\}*P\{NonAck\}=P\{NACK,NonAck\} \quad (3)$$

where P{DTX, NonAck} is a joint probability of DTX and NonAck events and P{NACK, NonAck} is a joint probability of NACK and NonAck events.

For the conditional probabilities P{NACK|NonAck} and P{DTX|NonAck}, their sum is one. In other words, $$P\{NACK|NonAck\}=1-P\{DTX|NonAck\} \quad (4)$$

Furthermore, the joint probability of DTX and NonAck is equal to the probability of DTX while the joint probability of NACK and NonAck is the probability of NACK, i.e., $$P\{DTX,NonAck\}=P\{DTX\}$$

$$P\{NACK,NonAck\}=P\{NACK\} \quad (5)$$

Substituting equations 3-5 into equation 2 yields:

$$\text{downStep}_{NonAck}=\text{downStep}*P\{DTX\}/P\{NonAck\}-\text{upStep}*(1-P\{DTX\}/P\{NonAck\}) \quad (6)$$

Once PDCCH and PDSCH reach steady-state BLER, on average, no adjustment is expected on PDCCH. That means that $$\text{upStep}=\text{downStep}*\text{BLER}_{pdcch}/(1-\text{BLER}_{pdcch}) \quad (7)$$

At that time, P{DTX}=BLER$_{pdcch}$ and P{NonAck}~=BLER$_{pdsch}$ (as those are our steady-state BLERs). Although, in LTE, TargetBLER$_{pdsch}$ is defined for HARQ initial transmissions. In this embodiment, P{NonAck} is approximated as BLER$_{pdsch}$, as generally the error rate for HARQ retransmissions is greatly smaller than the error rate for HARQ initial transmissions and can be ignored.

Substituting equation 7 into equation 6 yields:

$$\text{downStep}_{NonAck} = [\text{downStep} * \text{BLER}_{pdcch}/(1-\text{BLER}_{pdcch})]*(1-\text{BLER}_{pdsch})/\text{BLER}_{pdsch} \qquad (8)$$

Using equation 7, equation 8 can be rewritten into:

$$\text{downStep}_{NonAck} = \text{upStep} * (1-\text{BLER}_{pdsch})/\text{BLER}_{pdsch} \qquad (9)$$

In this embodiment, equation 9 suggests that for PDCCH, if $\text{downStep}_{NonAck}$ adjustment is done for all Non ACK HARQ feedbacks, the adjustment needs to be computed based on $\text{BLER}_{pdsch}$ rather than on $\text{BLER}_{pdcch}$.

In some embodiments, equation 9 can be used to compute the value of $\text{downStep}_{NonAck}$ in step 318. Since Target $\text{BLER}_{pdsch}$ is known to the network node 12, this can be used as an approximation of $\text{BLER}_{pdsch}$:

$$\text{downStep}_{NonAck} = \text{upStep} * (1-\text{TargetBLER}_{pdsch})/\text{TargetBLER}_{pdsch} \qquad (10)$$

Equation 10 assumes that $\text{BLER}_{pdsch}$ has reached steady-state. Even when not in steady-state, $\text{TargetBLER}_{pdsch}$ is likely still a good approximation of the $\text{BLER}_{pdsch}$. In another embodiment, $\text{BLER}_{pdsch}$ can be estimated. In this embodiment, equation 9 can be written as:

$$\text{downStep}_{NonAck}(t) = \text{upStep} * (1-\text{EstBLER}_{pdsch}(t))/\text{EstBLER}_{pdsch}(t) \qquad (11)$$

Figure 6:
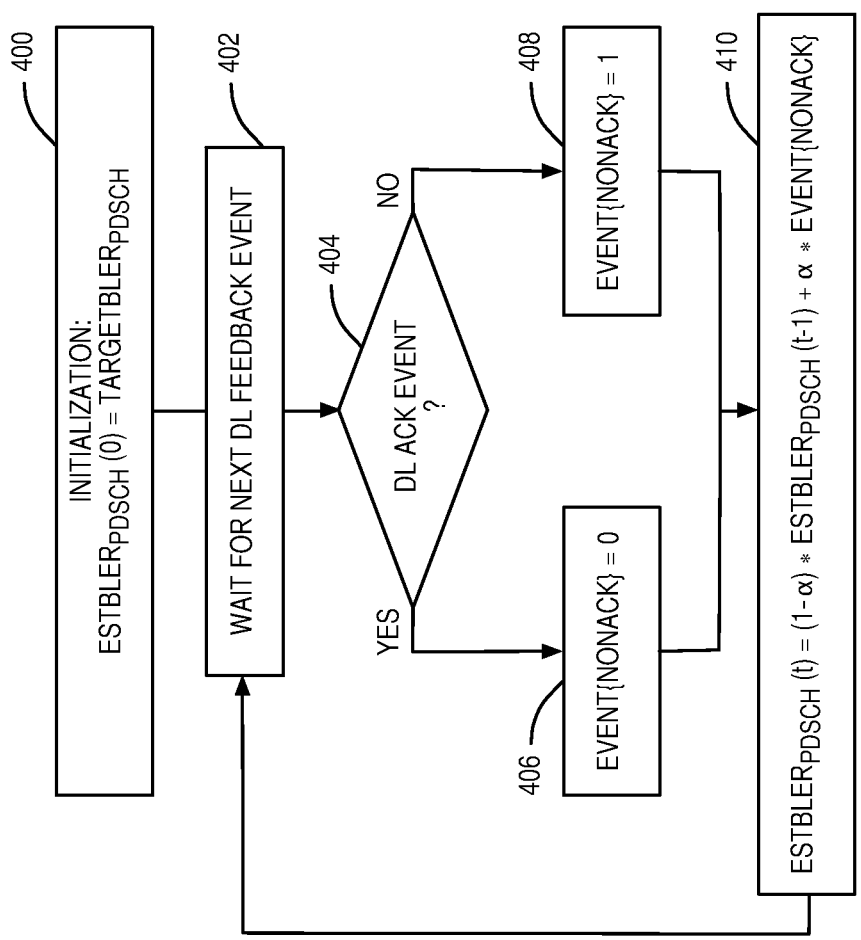
FIG. 6 illustrates a process for estimating the Block Error Rate (BLER) of a Physical Downlink Shared Channel (PDSCH) according to some embodiments of the present disclosure.

FIG. 6 illustrates a process for calculating $\text{EstBLER}_{pdsch}(t)$ for a wireless device 14 in a cell according to some embodiments of the present disclosure. First, the value of $\text{EstBLER}_{pdsch}(0)$ is initialized (step 400). In this embodiment, $\text{EstBLER}_{pdsch}(0)$ is set to be $\text{TargetBLER}_{pdsch}$, but the current disclosure is not limited thereto. Next the process waits for the next DL feedback event from the wireless device 14 for the cell which may be a HARQ feedback (step 402). If the feedback event from the wireless device 14 for the cell is an ACK (step 404), suggesting the downlink data from the cell to the wireless device 14 were received successfully by the wireless device 14, the value of EVENT{NonAck} is set to 0 (step 406). If the feedback event is not an ACK, the value of EVENT{NonAck} is set to 1 (step 408). The new value of $\text{EstBLER}_{pdsch}(t)$ can then be calculated based on the occurrence or non-occurrence of EVENT{NonAck} and the value of $\text{EstBLER}_{pdsch}(t-1)$ (step 410):

$$\text{EstBLER}_{pdsch}(t) = (1-\alpha) * \text{EstBLER}_{pdsch}(t-1) + \alpha * \text{Event\{NonAck\}} \qquad (12)$$

where the weighting factor $\alpha$ is a predefined weighting factor between zero and one inclusive. This is only one way to calculate an estimated $\text{BLER}_{pdsch}$. Other methods disclosed herein are equally applicable in those circumstances.

For the method of operation described in FIG. 5, all non-ACK events (NonACK) for the cell from the wireless device 14 were treated equally. While this enables the outer-loop adjustment for the link adaptation for a wireless device 14 in a cell in the presence of an ambiguous state of reception of the control signal by the wireless device 14, the $\text{downStep}_{NonACK}$ is also used in cases where there is no ambiguity. For instance, in some cases, a NACK is unambiguously an indication that the control signal from the cell was received by the wireless device 14, and a DTX is unambiguously an indication that the control signal from the cell was not received by the wireless device 14. In the case where the control signal was received, the $\text{downStep}_{NonACK}$ is an adjustment in the wrong direction. In the case where the control signal was not received, $\text{downStep}_{NonAck}$ is an adjustment in the correct direction, but not of the correct magnitude (as $\text{downStep}_{NonAck}$ is always less than or equal to downStep in the above embodiments).

Figure 7:
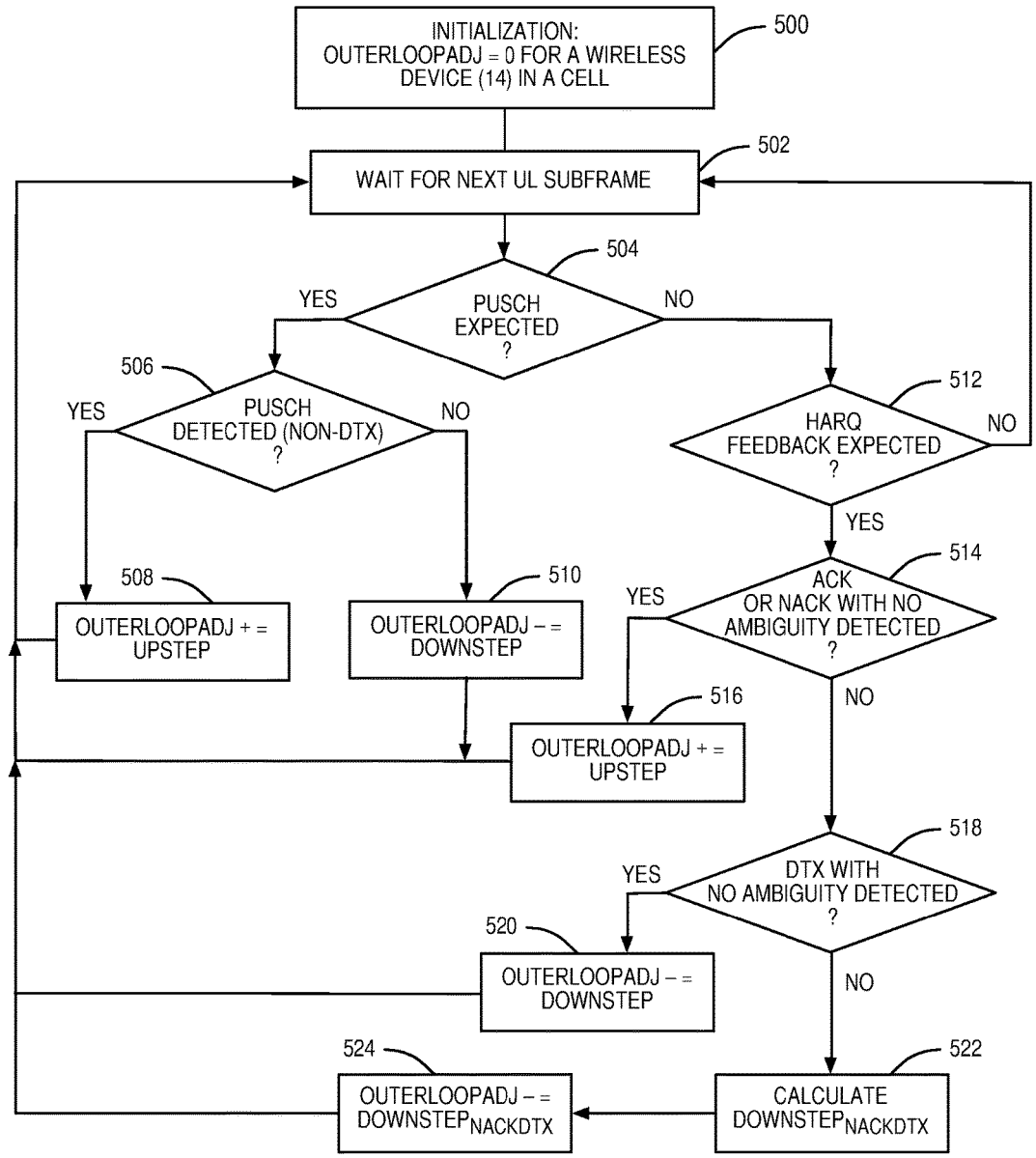
FIG. 7 illustrates another procedure for performing a control-signal outer-loop adjustment for link adaptation when detecting an ambiguous state of reception of a control signal by a wireless device according to some embodiments of the present disclosure.

To address these issues, FIG. 7 illustrates another procedure of a network node 12 in a cell for performing a control-signal outer-loop adjustment for the PDCCH LA for a wireless device 14 in the cell when detecting an ambiguous state of reception of a control signal of the cell by the wireless device 14 according to some embodiments of the present disclosure. As illustrated, the network node 12 first initializes the outerLoopAdj value for the wireless device 14 (step 500). In this example, the outerLoopAdj value is set to zero, but the current disclosure is not limited thereto. The outerLoopAdj value is potentially updated for each UL subframe, and the network node 12 waits for the next UL subframe (step 502). Similar to the process in steps 108-114 of FIG. 3 and steps 304-310 of FIG. 5, the network node 12 then checks on the presence of PUSCH if a PUSCH corresponding to a UL grant of the cell to the wireless device 14 is expected (step 504). If a PUSCH is detected (step 506), outerLoopAdj is adjusted up by upStep (step 508). This indicates that the PDCCH was received by the wireless device 14, and the network node 12 can increase the outerLoopAdj to send to link adaptation 24. If PUSCH was expected but is not detected, outerLoopAdj is adjusted down by downStep (step 510). This indicates that the PDCCH was not received by the wireless device 14, and the network node 12 should decrease the outerLoopAdj to send to link adaptation 24. When the wireless device 14 fails to send a transmission this is referred to herein as a DTX.

If PUSCH is not expected, a determination is made as to whether HARQ feedback corresponding to a DL assignment of the cell to the wireless device 14 is expected in the subframe (step 512). If HARQ feedback is not expected, the process returns to step 502 to wait for the next UL subframe. If HARQ feedback is expected, the network node 12 checks for an ACK or a NACK with no ambiguity from wireless device 14 (step 514). When an ACK or a NACK with no ambiguity is received, outerLoopAdj is adjusted up by upStep (step 516). This indicates that the PDCCH was received by the wireless device 14, and the network node 12 can increase the outerLoopAdj to send to link adaptation 24. If an ACK or a NACK with no ambiguity is not received, the network node 12 checks for a DTX with no ambiguity (step 518). If a DTX with no ambiguity is detected, outerLoopAdj is adjusted down by downStep (step 520). This indicates that the PDCCH was not received by the wireless device 14, and the network node 12 should decrease the outerLoopAdj to send to link adaptation 24. Otherwise, a NackDtx has occurred where the network node 12 is unable to distinguish whether a NACK or a DTX has occurred. The network node 12 then calculates a value for $\text{downStep}_{NackDtx}$ (step 522). This same value is used for all cases related to the wireless device 14 where the network node 12 is unable to distinguish whether a NACK or a DTX has occurred at the wireless device 14. Note that this calculation step may be accomplished in any suitable manner and may be calculated in advance or received from some other source.

Once the value of $\text{downStep}_{NackDtx}$ has been calculated or otherwise determined, the network node 12 adjusts outerLoopAdj down by $\text{downStep}_{NackDtx}$ (step 524). According to some embodiments, by updating the LA parameter when any of these events occurs, the network node 12 is able to make adjustments even in ambiguous situations. This stands in contrast to the method described in FIG. 3 where any ambiguous cases caused the method to make no changes to the LA parameter. Another difference between the method of operation described here in FIG. 7 and the one described in FIG. 3 is the treatment of sCells. In the method of operation described in FIG. 3, sCells were treated differently. In the method of operation described in FIG. 7, sCells may be treated the same as pCells or a single cell, according to some embodiments. This also stands in contrast to the method described in FIG. 5 where non-ambiguous NACK and DTX and any ambiguous cases all make a decrement of the same amount to the LA parameter. In the method of operation described in FIG. 7, non-ambiguous NACK makes an increment of upStep to the LA parameter, and non-ambiguous DTX makes a decrement of downStep to the LA parameter, while ambiguous cases makes a decrement with an amount of downStep to the LA parameter.

The value of $downStep_{NackDtx}$ can be calculated in many different ways. In some embodiments, downStep is an averaged downStep which is computed based on the estimated probability of NackDtx events. In some embodiments, by using an averaged downStep outer-loop adjustment when there is an ambiguity between NACK and DTX, which is smaller than the normal downStep adjustment, the adjustment is smaller and completed in multiple steps. This precision may help reduce the variations of the PDCCH adjustment.

One way to calculate the value of $downStep_{NackDtx}$ in step 522 is to derive a statistical model in ambiguous HARQ feedback events for PDCCH outer-loop adjustment when a feedback corresponding to a DL assignment is received.

In some embodiments, equations similar to equations 2 and 3 above can be written as:

$$downStep_{NackDtx}=downStep*P\{DTX,NackDtx\}/P\{NackDtx\}-upStep*(1-P\{DTX,NackDtx\}/P\{NackDtx\}) \quad (13)$$

In the following, for notational simplicity, P{AmbDTX} is used to represent the joint probability P{AmbDTX, NackDtx}, i.e., for ambiguous DTX when DTX is embedded in NackDtx events. As such, equation 13 can be expressed into this form:

$$downStep_{NackDtx}=downStep*P\{AmbDTX\}/P\{NackDtx\}-upStep*(1-P\{AmbDTX\}/P\{NackDtx\}) \quad (14)$$

Note that P{AmbDTX} can be estimated as Target $BLER_{pdcch}$ minus P(NonAmbDTX), where $TargetBLER_{pdcch}$ is equal to P{DTX} when PDCCH reaches its target BLER and NonAmbDTX stands for the DTX events that can be detected by the network node 12 without any ambiguity. Here, the relationship between downStep and upStep for PDCCH is still given by equation 7. However, P{AmbDTX} and P{NackDtx} may not be equal to $BLER_{pdcch}$ and $BLER_{pdsch}$, respectively, as some NonAck events can be determined as true NACKs, so the occurrence probability of NackDtx events is different from that of NACK. In other words, if a NonACK event is determined as a true NACK, implying the wireless device 14 successfully decoded PDCCH but failed to decode PDSCH, upStep should be used in PDCCH outer-loop adjustment, and that is not included in the $downStep_{NackDtx}$ above. Similarly, when a true DTX is detected, a downStep would be used for PDCCH outer-loop adjustment and that is not included in the $downStep_{NackDtx}$ either. Therefore, both P{NackDtx} and P{AmbDTX} are unknown and have to be estimated.

Figure 8:
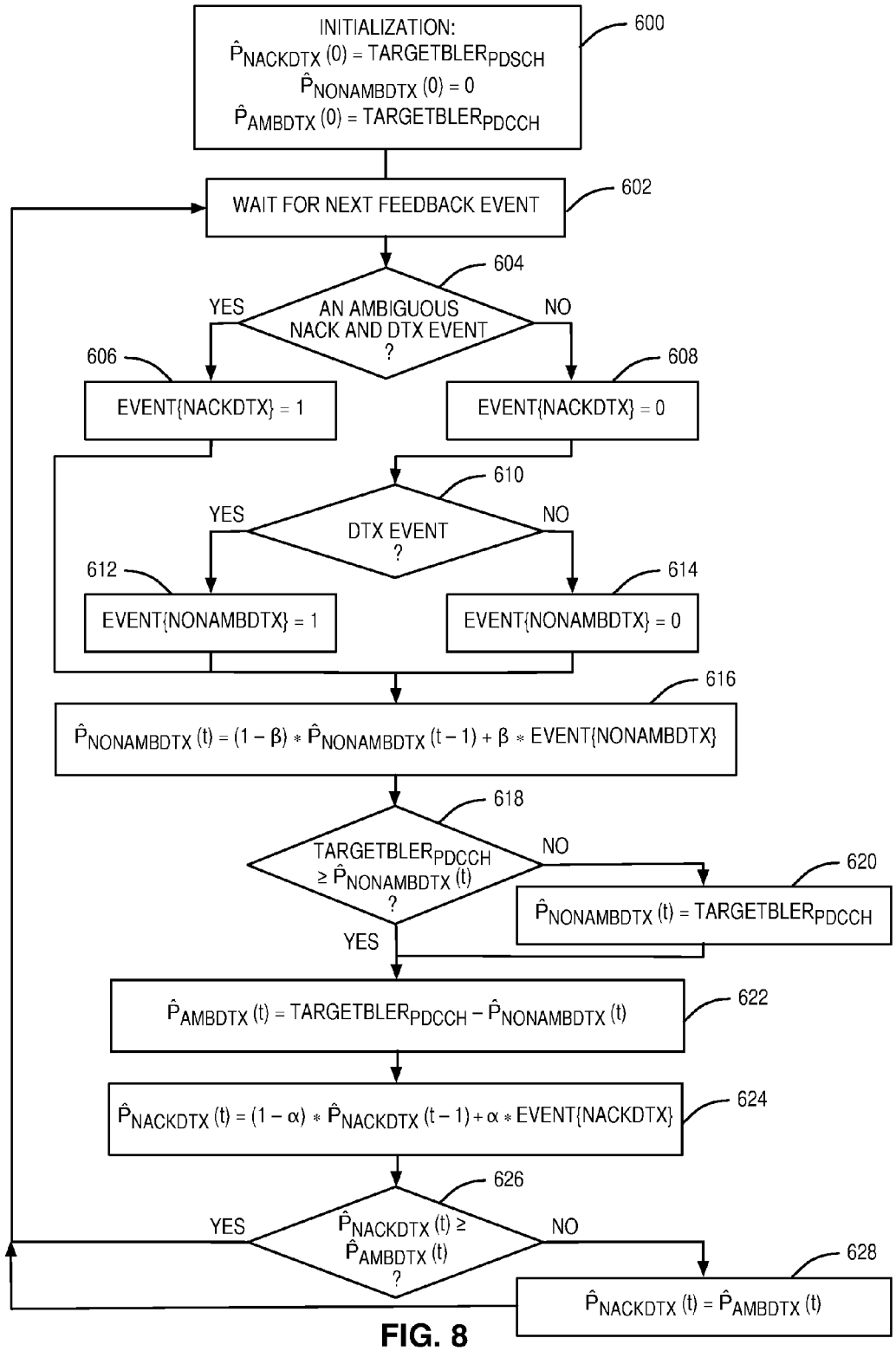
FIG. 8 illustrates a process for estimating the probability a network node will detect an ambiguous state of reception of the control signal by the wireless device ($\hat{P}_{NackDtx}$) and an estimated probability the network node will detect an ambiguous state of Discontinuous Transmission (DTX) by the wireless device ($\hat{P}_{AmbDtx}$) according to some embodiments of the present disclosure.

FIG. 8 illustrates for a given wireless device 14 a process for estimating the probability of a network node 12 in a cell detecting an ambiguous state of reception of the control signal of the cell by the wireless device 14 ($\hat{P}_{NackDtx}$) and an estimated probability of the network node 12 in the cell detecting an ambiguous state of discontinuous transmission (DTX) by the wireless device 14 ($\hat{P}_{AmbDtx}$) according to some embodiments of the present disclosure. In FIG. 8, the value of $\hat{P}_{NackDtx}(0)$, $\hat{P}_{NonAmbDtx}(0)$, and $\hat{P}_{AmbDtx}(0)$ for a wireless device 14 in a cell are all initialized (step 600). In this embodiment, $\hat{P}_{NackDtx}(0)$ is set to be $TargetBLER_{pdsch}$, $\hat{P}_{NonAmbDtx}(0)$ is set to be 0, and $\hat{P}_{AmbDtx}(0)$ is set to be $TargetBLER_{pdcch}$, but the current disclosure is not limited thereto. Next the process waits for the next feedback event which may be a HARQ feedback (step 602) from the wireless device 14 for the cell. If the feedback event is a NackDtx (ambiguous NACK and DTX) (step 604), the value of EVENT{NackDtx} is set to 1 (step 606). If the feedback event is not a NackDtx, the value of EVENT{NackDtx} is set to 0 (step 608). Similarly, if the feedback event is a DTX (unambiguous DTX) (step 610) the value of $\hat{P}_{NonAmbDtx}$ EVENT{NonAmbDTX} is set to 1 (step 612). If the feedback event is not an unambiguous DTX, the value of EVENT{NonAmbDTX} is set to 0 (step 614).

The new value of $\hat{P}_{NonAmbDtx}(t)$ can then be calculated based on the occurrence or non-occurrence of EVENT{NonAmbDTX} and the value of $\hat{P}_{NonAmbDtx}(t-1)$ (step 616):

$$\hat{P}_{NonAmbDtx}(t)=(1-\beta)*\hat{P}_{NonAmbDtx}(t-1)+\beta*Event\{NonAmbDTX\} \quad (15)$$

where the weighting factor β is a predefined weighting factor between zero and one inclusive. This is only one way to calculate an estimated probability of an unambiguous DTX. Other ways are possible and the methods disclosed herein are equally applicable in those circumstances.

Since there cannot be more unambiguous DTX events than total DTX events, and in most embodiments the probability of a DTX event is equal to the $TargetBLER_{pdcch}$, the value of $\hat{P}_{NonAmbDtx}(t)$ is checked against the value of $TargetBLER_{pdcch}$ (step 618). If a newly computed value of $\hat{P}_{NonAmbDtx}(t)$ is greater than $TargetBLER_{pdcch}$, the value of $\hat{P}_{NonAmbDtx}(t)$ is set to $TargetBLER_{pdcch}$ (step 620).

The estimate of P{AmbDTX}, denoted by $\hat{P}_{AmbDtx}$, can then be obtained as the $TargetBLER_{pdcch}$ minus the estimate of P(NonAmbDTX) (step 622):

$$\hat{P}_{AmbDtx}(t)=TargetBLER_{pdcch}-\hat{P}_{NonAmbDtx}(t) \quad (16)$$

The new value of $\hat{P}_{NackDtx}(t)$ can then be calculated based on the occurrence or non-occurrence of EVENT{NackDtx} and the value of $\hat{P}_{NackDtx}(t-1)$ (step 624):

$$\hat{P}_{NackDtx}(t)=(1-\alpha)*\hat{P}_{NackDtx}(t-1)+\alpha*Event\{NackDtx\} \quad (17)$$

where the weighting factor α is a predefined weighting factor between zero and one inclusive. This is only one way to calculate an estimated probability of NackDtx. Other ways are possible and the methods disclosed herein are equally applicable in those circumstances.

Note that by definition, as P{AmbDTX} is the joint probability P{DTX, NackDtx}. So, P{AmbDTX}≤P{NackDtx}. A regulation is applied on the estimated $\hat{P}_{NackDtx}(t)$ based on this (step 626). If $\hat{P}_{NackDtx}(t)$ is smaller than $\hat{P}_{AmbDTX}(t)$, $\hat{P}_{NackDtx}(t)$ is set to $\hat{P}_{AmbDTX}(t)$ (step 628). Again, this is only some embodiments for how to calculate the value of $downStep_{NackDtx}$ in step 522. Other methods disclosed herein are equally applicable in those circumstances.

Figure 9:
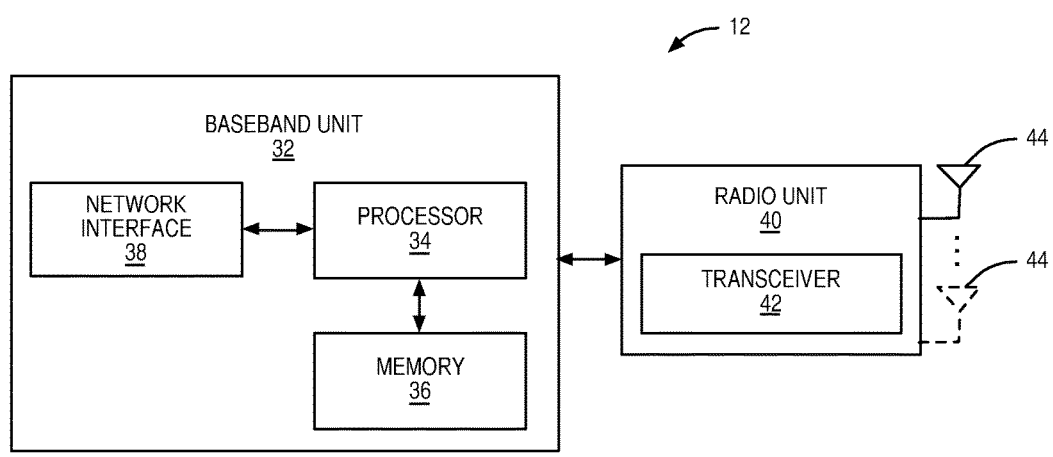
FIG. 9 is a block diagram of a network node according to some embodiments of the present disclosure.

FIG. 9 is a block diagram of a network node 12 according to some embodiments of the present disclosure. As illustrated, the network node 12 includes a baseband unit 32 with a processor 34, memory 36, and a network interface 38. As illustrated, the network node 12 also includes a radio unit 40 with a transceiver 42 and one or more antennas 44. In some embodiments, the network node 12, or the functionality of the network node 12 described with respect to any one of the embodiments described herein, is implemented in software that is stored in, e.g., the memory 36 and executed by the processor 34. The network interface 38 may include one or more components (e.g., network interface card(s)) that connect the network node 12 to other systems.

In some embodiments, a computer program including instructions which, when executed by at least one processor, causes the at least one processor to carry out the functionality of the network node 12 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 36).

Figure 10:
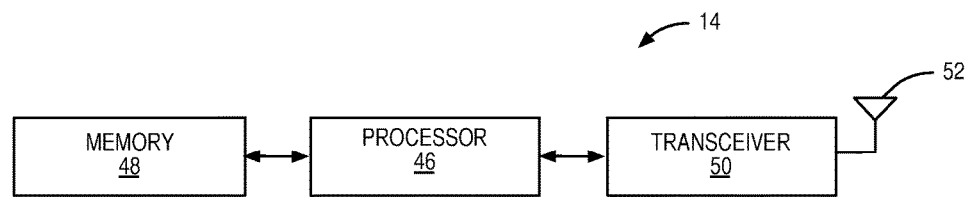
FIG. 10 is a block diagram of a wireless device according to some embodiments of the present disclosure.

FIG. 10 is a block diagram of a wireless device 14 according to some embodiments of the present disclosure. As illustrated, the wireless device 14 includes a processor 46, memory 48, a transceiver 50, and at least one antenna 52. In some embodiments, wireless device 14, or the functionality of the wireless device 14 described with respect to any one of the embodiments described herein, is implemented in software that is stored in, e.g., the memory 48 and executed by the processor 46. The transceiver 50 uses the at least one antenna 52 to transmit and receive signals and may include one or more components that connect the wireless device 14 to other systems.

In some embodiments, a computer program including instructions which, when executed by at least one processor, causes the at least one processor to carry out the functionality of the wireless device 14 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 48).

Figure 11:
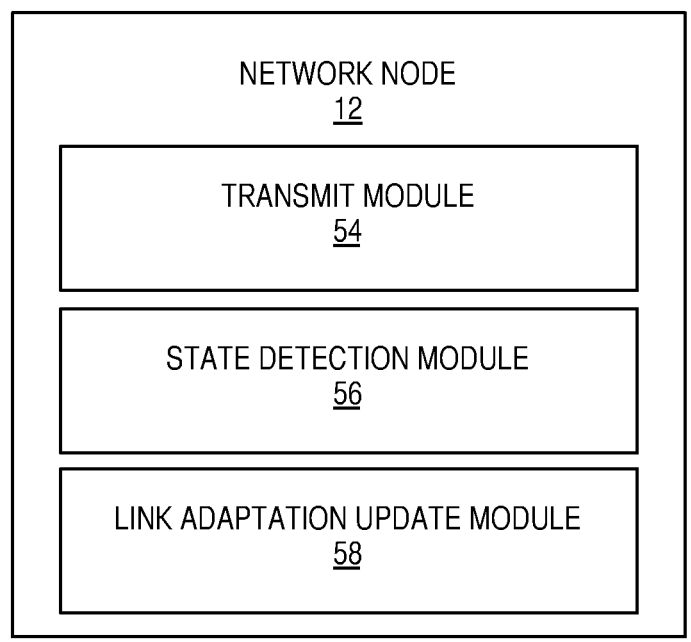
FIG. 11 is a block diagram of a network node including a transmit module, a state detection module, and a link adaptation update module according to some embodiments of the present disclosure.

FIG. 11 is a block diagram of network node 12 according to some embodiments of the present disclosure. As illustrated, the network node 12 includes a transmit module 54, a state detection module 56, and a link adaptation update module 58 that are each implemented in software that, when executed by a processor of the network node 12, causes the network node 12 to operate according to one of the embodiments described herein. The transmit module 54 operates to transmit a control signal to a wireless device 14, as described above with respect to the transmitting step 200. The state detection module 56 operates to detect an ambiguous state of reception of the control signal by the wireless device 14 as discussed above with respect to, for example, steps 202-202C. The link adaptation update module 58 operates to update an LA parameter as discussed above with respect to, for example, step 204.

The following acronyms are used throughout this disclosure.

3GPP 3$^{rd}$ Generation Partnership Project
ACK Acknowledgement
BLER Block Error Rate
CCE Control Channel Elements
CQI Channel Quality Indicator
DCI Downlink Control Information
DL Downlink
DTX Discontinuous Transmission
eNB Evolved (or Enhanced) Node B
HARQ Hybrid Automatic Repeat Request
LA Link Adaptation
LTE Long Term Evolution
NACK Negative Acknowledgement
outerLoopAdj Outer-Loop Adjustment
pCell Primary Cell
PDCCH Physical Downlink Control Channel
PDSCH Physical Downlink Shared Channel
PUCCH Physical Uplink Control Channel
PUSCH Physical Uplink Shared Channel
sCell Secondary Cell
SINR Signal-to-Interference-and-Noise Ratio
SR Scheduling Request
UE User Equipment
UL Uplink
WiMAX Worldwide Interoperability for Microwave Access Those skilled in the art will recognize improvements and modifications to the embodiments of the present disclosure. All such improvements and modifications are considered within the scope of the concepts disclosed herein and the claims that follow.

What is claimed is:

1. A method of operation of a network node in a cellular communications network comprising:
    transmitting a control signal to a wireless device, where the control signal includes scheduling information for a data signal to be sent to the wireless device;
    transmitting the data signal to the wireless device according to the scheduling information;
    receiving a feedback of reception of the data signal from the wireless device;
    detecting an ambiguous state of reception of the control signal by the wireless device based on the feedback of reception of the data signal, where detecting the ambiguous state of reception of the control signal by the wireless device comprises detecting that the network node is unable to distinguish whether a negative acknowledgment, NACK, or a discontinuous transmission, DTX, has occurred; and
    in response to detecting the ambiguous state of reception, updating a link adaptation, LA, parameter used to choose a coding scheme and power level for transmission of information in the control signal.

2. The method of claim 1 wherein detecting the ambiguous state of reception of the control signal by the wireless device comprises detecting that an acknowledgement, ACK, of the transmission of the data signal was not received.

3. The method of claim 2 wherein updating the LA parameter used to choose the coding scheme and power level comprises decrementing the LA parameter by a predetermined amount.

4. The method of claim 3 where the predetermined amount is based on a block error rate, BLER, of one or more radio channels.

5. The method of claim 4 where the predetermined amount is $downStep_{NonAck}=upStep*(1-TargetBLER_{data})/TargetBLER_{data}$ where upStep is an amount by which the LA parameter is incremented when reception of the control signal is confirmed and $TargetBLER_{data}$ is the target BLER for the data signal.

6. The method of claim 4 where the predetermined amount is $downStep_{NonAck}(t)=upStep*(1-EstBLER_{data}(t))/EstBLER_{data}(t)$ where upStep is the amount by which the LA parameter is incremented when reception of the control signal is confirmed and $EstBLER_{data}(t)$ is the estimated BLER for the data signal at time t.

7. The method of claim 6 where the estimated BLER for the data is $EstBLER_{data}(t)=(1-\alpha)*EstBLER_{data}(t-1)+\alpha*Event\{NonAck\}$ where Event{NonAck} is set to zero when the network node receives an ACK at time t from the wireless device and is otherwise set to one, and $\alpha$ is a predefined weighting factor between zero and one inclusive.

8. The method of claim 1 wherein detecting the ambiguous state of reception of the control signal by the wireless device comprises detecting that the network node is unable to distinguish whether a negative acknowledgment, NACK, or a discontinuous transmission, DTX, has occurred.

9. The method of claim 8 wherein updating the LA parameter used to choose the coding scheme and power level comprises decrementing the LA parameter by a predetermined amount.

10. The method of claim 9 where the predetermined amount is based on a block error rate, BLER, of one or more radio channels.

11. The method of claim 10 where the predetermined amount is based on an estimated probability the network node will detect the ambiguous state of reception of the control signal by the wireless device, $\hat{P}_{NackDtx}$, and an estimated probability the network node will detect an ambiguous state of DTX by the wireless device, $\hat{P}_{AmbDtx}$.

12. The method of claim 11 where the predetermined amount is $downStep_{NackDtx}=downStep*\hat{P}_{AmbDtx}/\hat{P}_{NackDtx}-upStep*(1-\hat{P}_{AmbDtx}/\hat{P}_{NackDtx})$ where downStep is the amount by which the LA parameter is decremented when no reception of the control signal is confirmed and upStep is the amount by which the LA parameter is incremented when reception of the control signal is confirmed.

13. The method of claim 12 where $\hat{P}_{NackDtx}(t)=(1-\alpha)*\hat{P}_{NackDtx}(t-1)+\alpha*Event\{NackDtx\}$, $\hat{P}_{AmbDtx}=1-\hat{P}_{NonAmbDtx}$, and $\hat{P}_{NonAmbDTX}(t)=(1-\beta)*\hat{P}_{NonAmbDTX}(t-1)+\beta*Event\{NonAmbDTX\}$, where Event{NackDtx} is set to one when the network node detects the ambiguous state of reception of the control signal by the wireless device and is otherwise set to zero, Event{NonAmbDTX} is set to one when the network node detects a DTX without ambiguity by the wireless device and is otherwise set to zero, $\alpha$ is a weighting factor between zero and one inclusive, and $\beta$ is a weighting factor between zero and one inclusive.

14. The method of claim 1 wherein the cellular communications network is a Long Term Evolution, LTE, network.

15. The method of claim 1 wherein the control signal is transmitted on a Physical Downlink Control Channel, PDCCH.

16. A device comprising:
    at least one processor; and
    a memory coupled to the processor, the memory containing instructions executable by the at least one processor, whereby the device is configured to:
        transmit a control signal to a wireless device, where the control signal includes scheduling information for a data signal to be sent to the wireless device;
        transmit the data signal to the wireless device according to the scheduling information;
        receive a feedback of reception of the data signal from the wireless device;
        detect an ambiguous state of reception of the control signal by the wireless device based on the feedback of reception of the data signal, where detecting the ambiguous state of reception of the control signal by the wireless device comprises being configured to detect that the network node is unable to distinguish whether a negative acknowledgment, NACK, or a discontinuous transmission, DTX, has occurred; and
        in response to detecting the ambiguous state of reception, update a link adaptation, LA, parameter used to choose a coding scheme and power level for transmission of information in the control signal.

17. A network node in a cellular communications network, comprising:
    a processor; and
    a memory coupled to the processor, the memory containing instructions executable by the processor whereby the network node is configured to:
        transmit a control signal to a wireless device, where the control signal includes scheduling information for a data signal to be sent to the wireless device;
        transmit the data signal to the wireless device according to the scheduling information;
        receive a feedback of reception of the data signal from the wireless device;
        detect an ambiguous state of reception of the control signal by the wireless device based on the feedback of reception of the data signal, where detecting the ambiguous state of reception of the control signal by the wireless device comprises being configured to detect that the network node is unable to distinguish whether a negative acknowledgment, NACK, or a discontinuous transmission, DTX, has occurred; and
        in response to detecting the ambiguous state of reception, update a link adaptation, LA, parameter used to choose a coding scheme and power level for transmission of information in the control signal.

* * * * *